United States Patent [19]

Carr

[11] 3,989,294
[45] Nov. 2, 1976

[54] TWIST LOCK ARRANGEMENT FOR TYING CONTAINER DOWN
[75] Inventor: George W. Carr, Albuquerque, N. Mex.
[73] Assignee: Pullman Incorporated, Chicago, Ill.
[22] Filed: Oct. 24, 1975
[21] Appl. No.: 625,448

[52] U.S. Cl. ............................ 296/35 A; 105/366 B
[51] Int. Cl.² ........................................... B65J 1/22
[58] Field of Search ................ 296/35 A; 105/366 B

[56] References Cited
UNITED STATES PATENTS

| | | | |
|---|---|---|---|
| 3,701,562 | 10/1972 | Carr | 296/35 A |
| 3,768,857 | 10/1973 | Horton | 296/35 A |
| 3,825,294 | 7/1974 | Carr | 296/35 A |
| 3,866,970 | 2/1975 | Schwiebert | 296/35 A |

Primary Examiner—M. H. Wood, Jr.
Assistant Examiner—Gene A. Church
Attorney, Agent, or Firm—Richard J. Myers

[57] ABSTRACT

A chassis-to-container locking arrangement includes a housing defined by the lateral end extensions of the chassis bolster member thereby providing coupling assemblies at the four corners thereof. Each housing includes a twist lock arrangement which is operated by a horizontally swingable locking arm selectively operated whereby the twist locks are held in a raised open position or in a lowered closed position. The operating arm is rotatable in a slot provided in the housing. An operating member or locking rod is selectively movable and includes camming projections which lock the twist locks in locked position the same camming assemblies including stop members accommodating corner castings having a base of variable thickness.

15 Claims, 6 Drawing Figures

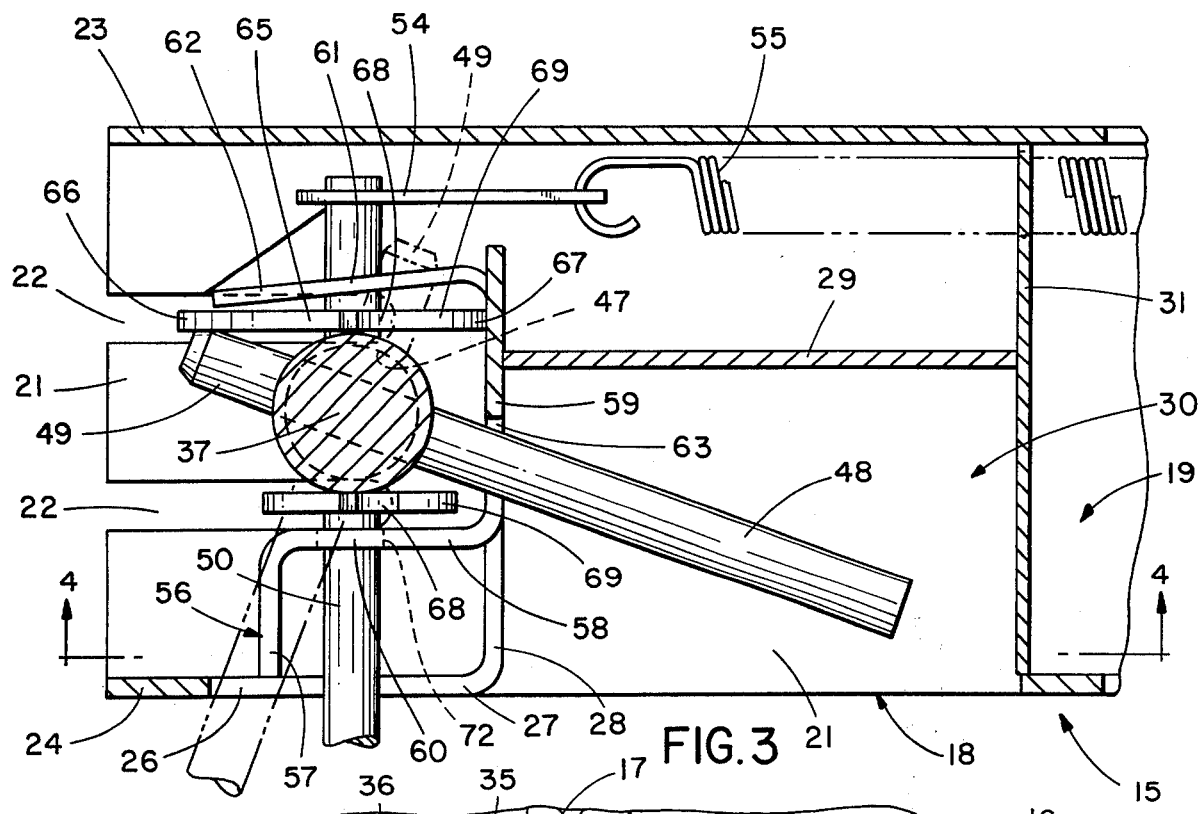
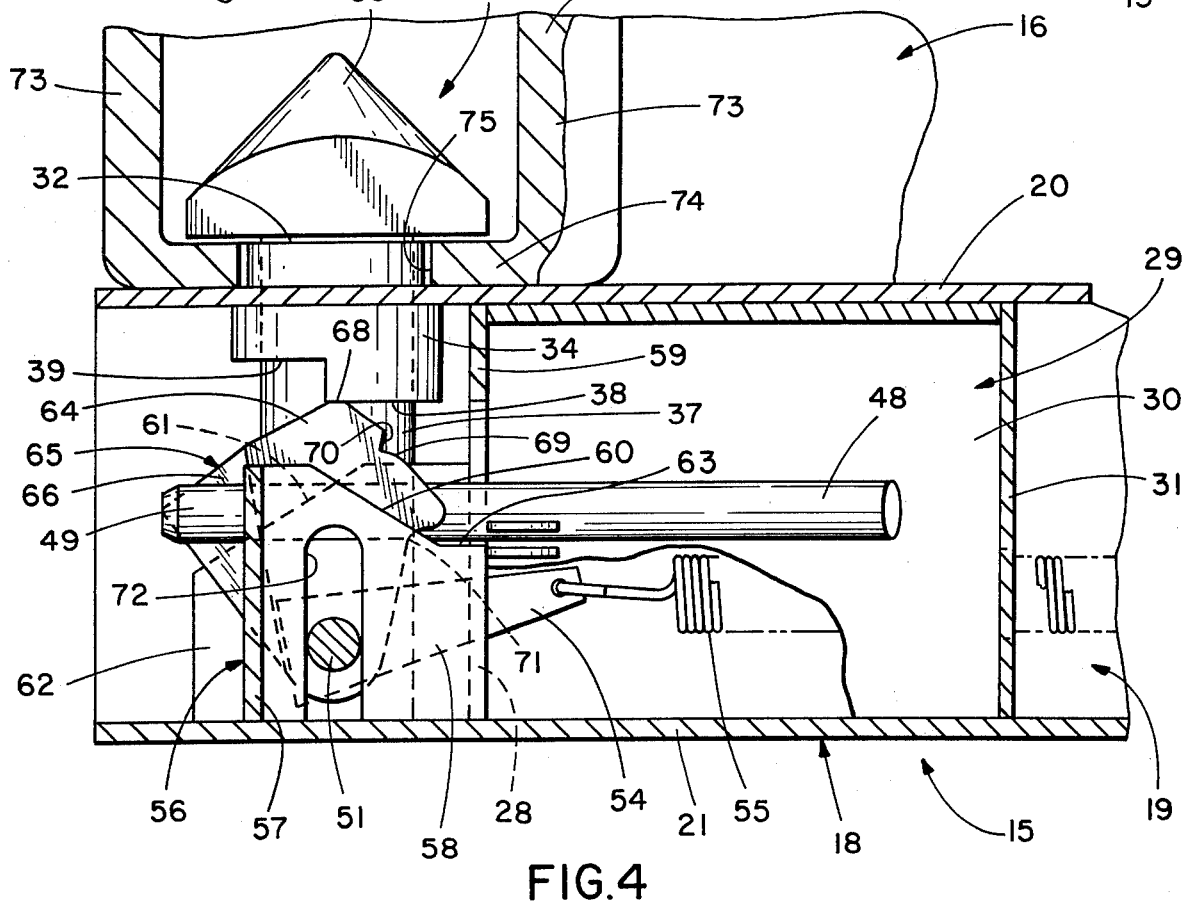

3,989,294

TWIST LOCK ARRANGEMENT FOR TYING CONTAINER DOWN

A related application is Ser. No. 584,236 filed June 5, 1975.

BACKGROUND OF THE INVENTION

Field of the Invention

This invention relates to a lock arrangement or body securing device for coupling of a removable container on the top of a transporting vehicle frame, such as the chassis of a highway semi-trailer.

Description of the Prior Art

The prior art is disclosed in my U.S. Pat. No. 3,701,562, Oct. 31, 1972, U.S. Pat. No. 3,717,372, Feb. 27, 1973, U.S. Pat. No. 3,719,385, Mar. 6, 1973, and U.S. Pat. No. 3,825,294, July 23, 1974. The present invention is an improvement in that a twist lock tie down mechanism has been disclosed which includes an effective operating arrangement permitting the twist lock to be selectively positioned to accommodate containers having corner castings with base walls of different thickness. Further, it is an improvement in that it provides a positive twist lock locking arrangement consisting of a selectively operated lever mechanism for maintaining the twist lock in an open position and which will release a second operating handle providing for the disengagement of the twist lock from its open to a locked position.

SUMMARY OF THE INVENTION

In the present invention, four coupling assemblies provided on the trailer chassis each includes a housing having a twist lock operating mechanism. The twist lock operating mechanism is rotatable from a raised to a lower locked position by means of an arm which is swingable from the open position into a recessed position within the housing. The arm is spring biased toward its closed recessed position by means of a spring arrangement. In the open position, against spring tension the horizontally movable arm is maintained in said position by means of a selectively operateable member including a rod and handle arrangement which includes a pair of stop or camming elements which engage the arm and hold the same against release until the operating rod is selectively moved to a release position. The operating rod must be moved to an out-of-the-way position before the operating arm can be moved to the locked or recessed position. The arrangement is such that the operating arm cannot be accidentally released. Further, in the closed position of the operating arm, the operating rod and handle member is again positioned in a manner wherein the operating arm cannot be rotated out of its locked position, which is also recessed within the housing. The selectively operable handle and operating rod further includes spaced cam and stop members which are each selectively positionable to engage the shear block extension of the device in a manner for accommodating containers having different thicknesses of corner casting bases. Thus, it is a prime object of the invention to provide an improved twist lock mechanism which cannot accidentally or inadvertently be moved from an open to a closed position or vice versa and yet which will be quickly movable into locked or unlocked positions as desired by the operator.

BRIEF DESCRIPTION OF THE DRAWINGS

FIG. 3 is a plan sectional view of a locking housing showing the twist lock and operating mechanism therefore;

FIG. 4 is a cross sectional view taken substantially along the line 4—4 of FIG. 3;

DESCRIPTION OF THE PREFERRED EMBODIMENT

Figure 1:
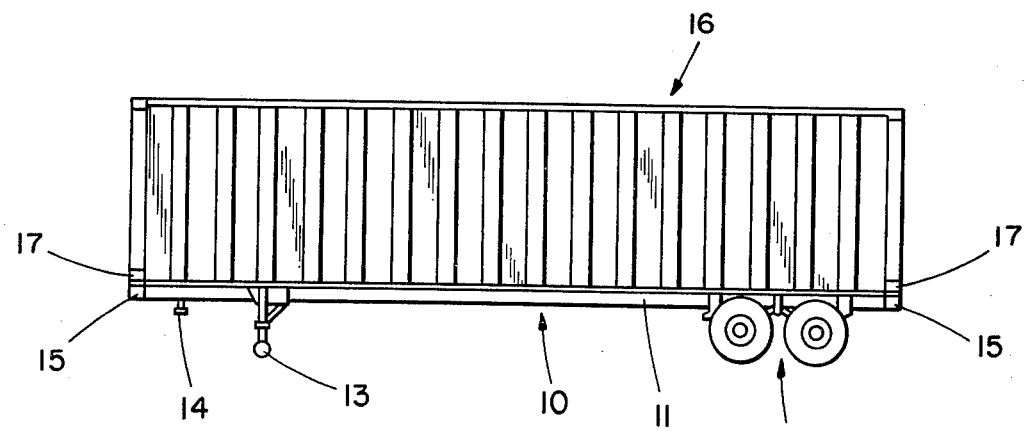
FIG. 1 is a side elevational view of a trailer chassis having a container connected thereto for over-the-highway operation.

Referring now particularly to FIG. 1, and over-the-highway trailer chassis 10 includes a chassis frame 11 supported on conventional wheel suspension 12 and having a front landing gear structure 13. A conventional king pin 14 is provided to connect the chassis frame to a suitable over-the-highway tractor (not shown). Each of the corners of the chassis 10 is provided by coupling assemblies generally designated at 15, which are adapted to be connected to a container 16 having container corner castings 17.

Figure 2:
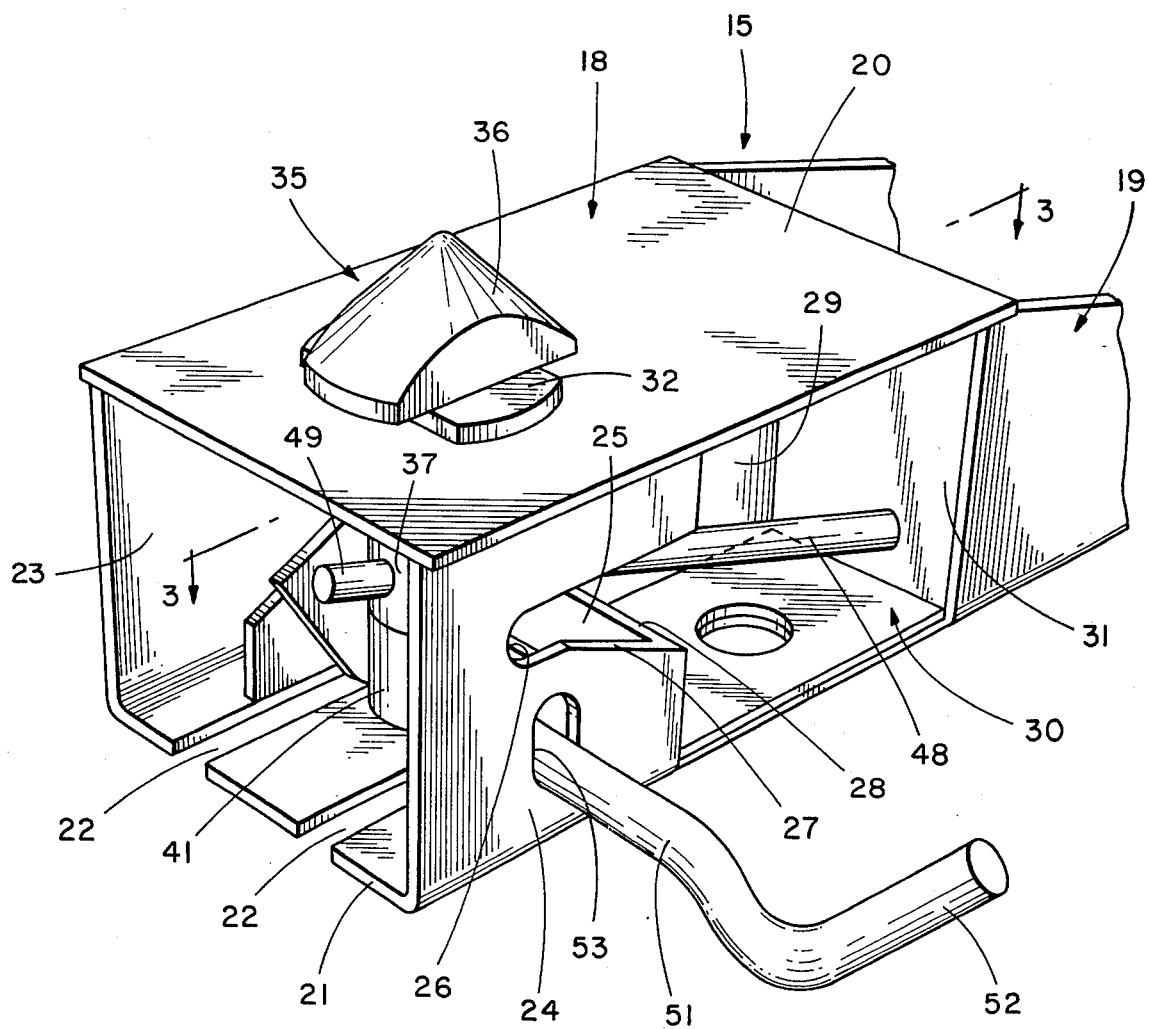
FIG. 2 is a perspective view of a locking housing, one of which is positioned at each of the four corners of the trailer chassis.

A locking housing 18 provided for each of the coupling assemblies 15 is best disclosed in FIGS. 2 through 6 and includes cross member or bolster portions 19 positioned at longitudinally opposite ends of the chassis frame 11 to which the locking housings 18 are connected. Each locking housing 18 includes a top wall 20, a bottom wall 21, having suitable slots 22 as indicated. The top wall 20 and bottom wall 21 are connected by means of vertical side walls 23 and 24. The walls 23 in the front bolster of the chassis face forwardly and the walls 23 at the rear bolster face rearwardly. Each of the walls 24 includes a horizontal slot 25 having a slot portion 26 which meets with a downwardly inclined guide portion 27. As best shown in FIGS. 2 and 3, the wall 27 meets with a transversely extending wall 28, extending laterally with respect to said wall. As shown in FIG. 3, a vertical intermediate wall 29 is disposed within the housing and extends substantially parallel to the walls 23 and 24. The wall 29, with an end wall 31, form a recess or pocket portion 30 within the housing which as shown in FIG. 2 opens outwardly with respect thereto.

A conventional shear block 32 projects upwardly from the top wall 20 and is provided with a bore 33 communicating with a tubular extension 34 which projects downwardly a short distance below the top wall 20. A locking pin or twist lock generally designated at 35 includes the cone head 36 having a downwardly projecting shank 37, which extends through the shear block bore 33 and through the tubular extension 34. The lower end of the tubular extension 34 is provided with a cam engageable projection 38 separated by an undercut portion 39.

Figure 6:
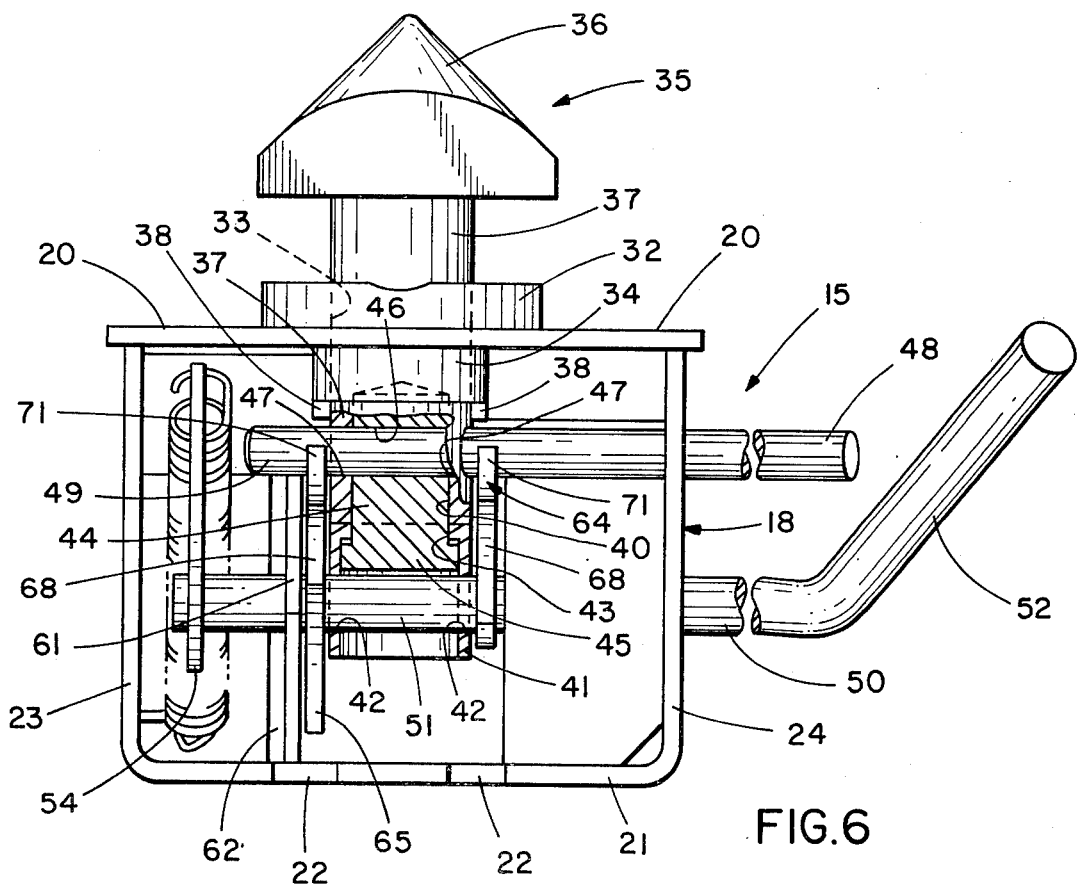
FIG. 6 is a similar view of FIG. 5 showing further a different operating position and details of construction.

Referring particularly to FIG. 6, the shank 37 includes a downwardly opening bore 40. A bushing 41 is disposed below the shank 37 and is concentric therewith and includes aligned openings 42. A bearing pin 44 is in mating engagement with the bore 40 of the shank 37. The bearing pin 44 projects through an opening 43 formed is the top portion of the bushing 41. The pin 44 includes an enlarged cylindrical head 45 which is captured within the opening 43 of the bushing 41, the said pin 44 including a transversely extending bore 46 in registry with openings 47 provided in the lower portion of shank 37.

A cylindrical operating arm 48 projects through the bore 46 and the openings 47 and includes an outward cylindrical extension 49. The cylindrical arm 48 also secures the bearing pin 44 for rotation about a vertical axis with the cone shank 37. The bushing 41 is free to move vertically with the shank 37. An operating member 50 includes a rod portion 51 and an operating handle 52. The operating rod portion 51 projects through the openings 42 of the bushing 41 and is relatively rotatable with respect thereto about its axis. The operating rod 50 and the bushing 41 therefore are movable vertically with the shank 37 but the bushing 41 is maintained against rotation by the arm 51 and the cone can freely rotate with respect thereto in independent fashion. The rod 50 is held against horizontal movement by means of a vertical slot 53 provided in the wall 24, as best shown on FIG. 2. The end of the rod 51 has connected thereto for rotation therewith a spring bracket 54 having a spring 55 connected thereto. The spring 55 continually urges the arm 54 to the position indicated in FIG. 4, the said spring 55 being suitably connected to a portion of the housing 20 or bolster member, the same merely being an anchoring connection (not shown).

The interior of the housing 18 includes the support or gusset bracket arrangement generally designated at 56. This arrangement includes a lateral wall 57 integral with a wall 58 which extends parallel to the wall 24. The wall 58 is also connected to the vertical transverse wall 28 previously described. The bracket arrangement 56 further includes an inwardly extending or lateral wall portion 63 in vertical alignment with the walls 28 and a downwardly projecting wall portion 59. The upper edge of the wall 58 includes a guiding portion 60 or surface which is inclined in the same manner and conforms to the guide surface 27 of the wall 24. This surface then also conforms to the height of the wall 28 and provides a horizontal rest surface on the top edge of the wall 63, as shown in FIG. 3, on which the arm 48 rests in the closed position. As also best shown in FIG. 3, another vertical wall 62 is disposed on the opposite sides of the pin 35 and is connected to the wall 63 the said wall 62 also having a guide surface 61 which is inclined downwardly in an opposite direction to the wall 60, as shown in FIG. 4. As shown in FIG. 3, the surface on which the arm 48 rests on the wall 28 is designated at 63.

As best shown in FIGS. 3, 4, and 6, the operating rod or member 50 includes camming means in the form of stop members or cams 64 and 65 connected to the rod 50 on opposite sides of the shank 37. The cams or stop members 64 and 65 are connected to the rod 52 and rotate therewith. As best shown in FIG. 3, the cam member 65 is provided with a rearwardly extended portion 66 and is similarly provided with a forwardly extended portion 67 the purposes of which will presently be described. Each of the stop members or cams 64 and 65 also includes aligned cam surfaces 68 and 69, one of which is disposed radially inwardly with respect to the other, as best shown in FIG. 4. The cam surface 68 and 69 are separated by means of a vertical stop face 70. Each of the cams further includes an arcuate stop surface 71, as best shown in FIG. 4, which are adapted to engage the rod portion 50 to maintain the twist lock in its open position as shown in FIG. 6. A vertical slot 72 is also provided in the wall 58 the same being in alignment with the slot 53 through which the rod portion 51 projects.

Figure 5:
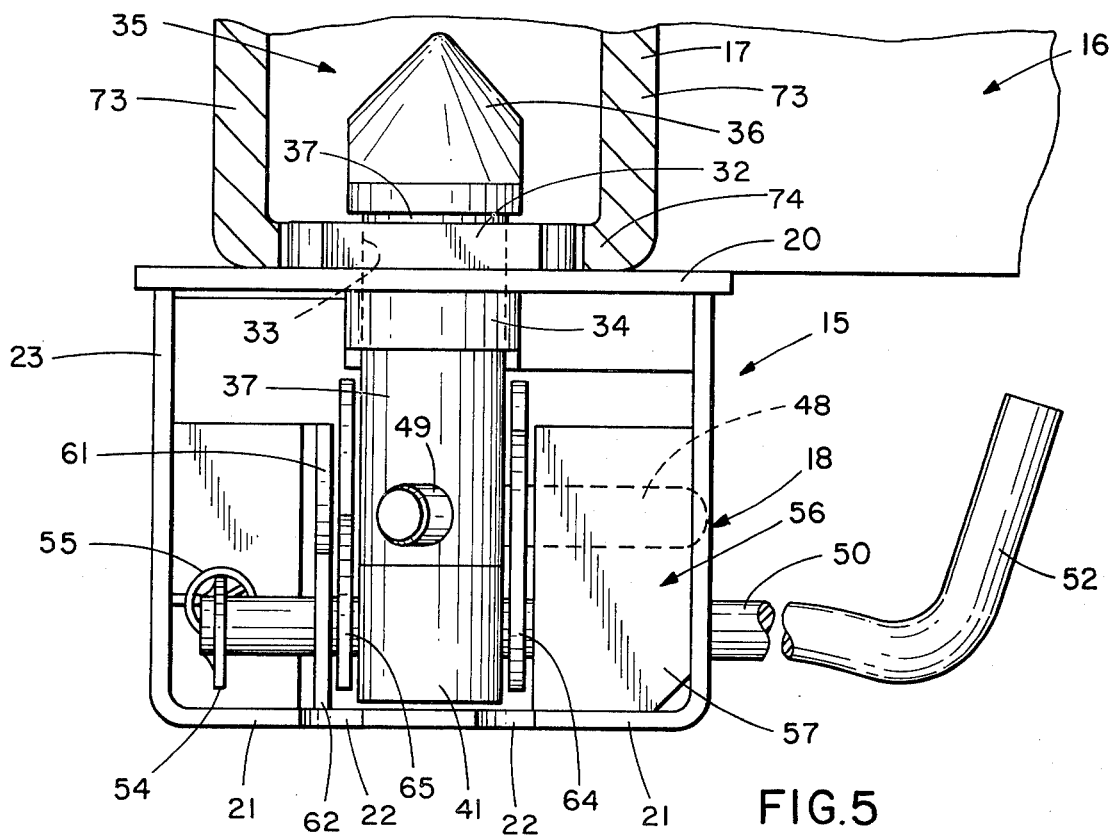
FIG. 5 is an end elevational view of the housing or coupling assembly containing a twist lock mechanism.

Referring now particularly to FIGS. 4 and 5, which disclose the corner of a container 16 suitably connected to the container locking housing in a locked position, each of the containers at the four corners thereof includes the corner castings 17, each of which comprises vertical wall 73 and a lower base wall 74. The base wall 74 is provided with a bore 75 through which the cone head 36 is movable in its open position and which upon rotation to the closed position, shown in FIGS. 4 and 5, locks the base and casting against vertical movement.

Operation

With the coupling assemblies in the open position, shown in FIG. 6, the container may be lowered onto said assemblies with the cones 36 passing through the slots 75 of each of the corner castings. In the open position, the handle 52 of the rod 50 is in the position shown in FIG. 6. In this position, the arcuate stop portions 71 of the stop members 64 and 65, shown in FIG. 4, are in engagement with the arm 48 which is in the outwardly projecting position shown in dotted lines in FIG. 3. The spring 55 is urging the rod 50 to rotate in a clockwise direction and thus the arcuate stop surfaces 71 in engagement with the arm 48 hold the said arm against rotation to the closed position. Assuming now that proper engagement has been made of the container corner castings with the twist lock and the container is firmly seated on the housings, the operator now grasps the handle 52 and rotates the same in a manner moving the cams 64 and 65 in a counter-clockwise direction from the position shown in FIG. 4 wherein the cams may move downwardly within the recesses or slots 22, shown in FIG. 2. The arm 48 is now in a release position since it is no longer held locked by means of the cam surfaces or stops 71. The arm 48 is now free to be moved by the operator to its recessed position shown in FIG. 3 whereupon the cone 63 is in a locked position, as shown in FIG. 4. Release of the handle 52 by the operator now provides for the spring to pull the cams 64 and 65 into the position shown in FIG. 4 wherein the cam or stop surfaces 68 are positioned directly under the cam engageable projection 38, thus preventing upward vertical movement of the cone head or locking pin. As shown in this position in FIG. 3, the forwardly extending portion 67 of the cam 68 is in engagement with the wall 59 to retain the arrangement in the position shown in FIG. 3. Also, in the position in FIG. 3, the extended end portion 66 of the cam 65 is in a locking or in-the-way position so that the arm 48 cannot be inadvertently moved or rotated to an unlocking position unless the operating handle 52 and mechanism is again actuated to its full counter-clockwise out-of-the-way position.

In the event that the casting base 74 is of a greater thickness than that shown in FIG. 4, the cams 64 and 65 are rotated into position whereupon the cam surfaces 69 are in engagement with the cam engageable projection 38 with the stop face 70 in engagement with the undercut portion 39. This then accommodates for the difference in vertical dimension of various base castings.

To release the twist lock it is a simple matter to again rotate the handle 52 and rod 50 in a counter-clockwise direction, shown in FIG. 4, wherein the cam members 64 and 65 are completely out-of-the-way and the handles 48 is then moved again outwardly of the recess travelling upwardly on the slope or guide surface 60 to the open position shown in FIG. 6.

The support gusset bracket 56 guide surfaces 60 and 61 extend in opposite inclined directions and, of course, this is for the purpose of having the projection 49 slide on the guide surface 61 wherein the other portion of the arm 48 slides on the guide surface 69 as the arm is rotated. In this manner, in the event a container is improperly aligned in crane loading and the weight of the container is in a downward direction on the twist lock, the bracket 56 provides an adequate support for assuming this vertical loading. It is, of course, apparent that the present twist lock rotation is approximately 90° and the difference in thickness of the bottom wall of the lower corner castings of various containers may vary from five eighths of an inch to one having 1-⅛ thickness of the bottom wall. The support gusset bracket, as indicated, provides additional support for the twist lock when it is accidentally loaded by the weight of the container. This could happen when the container is lowered by the crane and the aperture of the corner casting misses the cone. The present construction accommodates this type of arrangement.

It is also evident that the present twist lock is secured in its locked position by the force of the spring since when the spring has moved the operating rod and cam arrangement into the position shown in FIG. 4, and the arm 48 cannot be moved from its locked position. Thus every obstruction on the road and bump will have a tendency to increase the grip of the lock in the locked position. The accidental opening of the lock is also prevented by virtue of the necessity and complex movement of the two handles relative to each other. Further, the open position of the lock is secured by the force of the spring and the friction in the mechanism as clearly set forth above. Locking and unlocking action of the corner container locks is afforded quickly in a fraction of a second.

The foregoing description and drawings merely explain and illustrate the invention and the invention is not limited thereto, except insofar as the appendant claims are so limited, as those skilled in the art who have the disclosure before them will be able to make modifications and variations therein without departing from the scope of the invention.

What is claimed is:

1. In a highway trailer including a chassis having a plurality of cross members,
    a plurality of coupling assemblies located on lateral portions of the cross members, each assembly including,
    a locking housing including a top wall and vertical wall means,
    said top wall having an aperture including an upwardly projecting tubular shear block including a downwardly projecting tubular extension,
    a vertically extending locking pin having an upper head portion on said shear block and a shank portion rotatably and vertically movable in said tubular extension, said extension projecting downwardly within said housing,
    said vertical wall means including slot means having a downwardly inclined guide portion, the improvement comprising;
    manual operating mechanism including,
    a first operating member connected to said shank of said locking pin for rotating the same about its vertical axis,
    a second operating member including a rod having handle means and being connected to said shank of said locking pin for rotatable movement relative thereto about a horizontal axis,
    said rod being connected to said pin for vertical movement therewith and being supported on said housing against rotation during relative rotational movement of said locking pin shank about its vertical axis,
    camming means connected to said rod including a stop member,
    cam engageable means on said tubular extension,
    biasing means connected to said rod and housing for biasing said camming means in its locked position whereby said stop member engages said cam engageable means thereby locking said locking pin against vertical movement, and
    means on said rod in the locked position engaging said first operating member to lock the same against rotation and maintain said head portion in its locked position.

2. The invention in accordance with Claim 1, said first operating member including an arm connected to said shank and having first and second horizontal portions projecting outwardly horizontally on opposite sides of said shank,
    said first portion being adapted to project outwardly of said slot and being slideable on said guide portion upwardly for moving said head and shank of said pin to a raised unlock position.

3. The invention in accordance with claim 2, said locking means on said rod preventing rotation of said operating members including a second stop member mounted on said rod and engaging said second portion of said arm in the locked position thereof.

4. The invention in accordance with claim 1, said first operating member including an arm engaged in said slot and extending outwardly from said housing in the raised open position of said locking pin.

5. The invention in accordance with claim 4, said arm being slideable downwardly on said guide portion and rotatable to a locked position wherein said arm is recessed within said housing.

6. The invention in accordance with claim 1, said camming means including a second stop member, each of said stop members being disposed on opposite sides of said shank on said rod means and rotatable therewith.

7. The invention in accordance with claim 6, said first and second stop member including first and second cam portions radially disposed relative to said rod axis at varying radii and being adapted to selectively engage said engageable means of said extensions in the locked position to accommodate different base thicknesses of container corner castings.

8. The invention in accordance with claim 1, said first operating member including an arm horizontally movable through said slot into a recessed locked position within said housing.

9. The invention in accordance with claim 8, said stop member in said closed position of said arm locking the same against rotational movement.

10. The invention in accordance with claim 8, said rod being rotatable about its axis for pivoting said stop members to an out of the way position and said arm is movable in said slot to a position wherein said pin is in raised open position, and said stop member is then movable into engagement with said arm to lock the same against rotation in said open position.

11. The invention in accordance with claim 10, said camming means including a second stop member,
said stop members being disposed on said rod on opposite sides of said shank,
and both being in engagement with said arm in the open position thereof.

12. The invention in accordance with claim 1, said rod being connected to the shank of said pin by a bushing member having a horizontal aperture within which said rod is rotatable, bearing means connecting said bushing to said shank of said pin to provide for said relative rotation, and means on said housing engaged by said rod pivoting rotation of said rod about its axis and for vertical movement with said pin but restraining rotation of said bushing.

13. The invention in accordance with claim 1, said first operating member including an arm movable from a raised open position with said pin downwardly on said guide surfaces to a recessed locked position within said housing.

14. The invention in accordance with claim 13, including means connected to said arm and housing biasing said arm to its closed position.

15. The invention in accordance with claim 14, including bracket means within said housing having guide surfaces conforming to said guide portion and engageable with said arm during rotational and vertical movement of the same.

* * * * *